United States Patent
Grether et al.

(10) Patent No.: US 10,001,158 B2
(45) Date of Patent: Jun. 19, 2018

(54) ANTI-ROTATION FOR ECCENTRIC BUSHINGS

(71) Applicant: The Boeing Company, Chicago, IL (US)

(72) Inventors: Martin R. Grether, Everett, WA (US); Troy A. Haworth, Everett, WA (US); Thomas C. Wittenberg, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 207 days.

(21) Appl. No.: 14/826,577

(22) Filed: Aug. 14, 2015

(65) Prior Publication Data
US 2017/0045080 A1    Feb. 16, 2017

(51) Int. Cl.
| | |
|---|---|
| *F16B 5/02* | (2006.01) |
| *F16B 43/00* | (2006.01) |
| *B64C 1/06* | (2006.01) |
| *B64C 1/18* | (2006.01) |
| *F16B 2/00* | (2006.01) |
| *F16B 33/00* | (2006.01) |

(52) U.S. Cl.
CPC .............. *F16B 43/00* (2013.01); *B64C 1/061* (2013.01); *B64C 1/18* (2013.01); *F16B 2/005* (2013.01); *F16B 5/0225* (2013.01); *F16B 33/002* (2013.01)

(58) Field of Classification Search
CPC ........ F16B 5/025; F16B 5/0225; F16B 19/02; F16B 23/0046; F16B 2/005
USPC .......................................... 411/539, 238, 398
See application file for complete search history.

(56) References Cited

U.S. PATENT DOCUMENTS

| | | | | |
|---|---|---|---|---|
| 3,006,443 A | * | 10/1961 | Siler | E21D 7/00 285/148.27 |
| 4,309,123 A | * | 1/1982 | Moore | B25B 15/02 29/240 |
| 5,387,047 A | * | 2/1995 | Korpi | B60D 1/00 403/3 |
| 6,347,905 B1 | * | 2/2002 | Lukschandel | F16B 2/005 403/404 |
| 7,455,471 B2 | * | 11/2008 | Gawehn | F16B 5/025 16/2.1 |
| 7,857,565 B2 | * | 12/2010 | Martinson | F16B 43/00 280/86.753 |
| 8,528,273 B2 | * | 9/2013 | Burke | E04B 1/043 52/125.5 |

(Continued)

*Primary Examiner* — Flemming Saether
(74) *Attorney, Agent, or Firm* — Parsons Behle & Latimer

(57) ABSTRACT

An attachment system and method that includes first and second fittings, a first eccentric bushing positioned within the first fitting, and a second eccentric bushing positioned within the second fitting. The system may include a first friction washer positioned between the first bushing and first fitting and a second friction washer positioned between the second bushing and the second fitting. A coating on the exterior of the friction washers prohibits rotation of the bushings with respect to the fittings. The coating may be a nickel-diamond coating that prohibits rotation even in the presence of a lubricant. The first fitting may be a frame fitting connected to a fuselage of an aircraft and the second fitting may be a beam fitting connected to the floor of the aircraft. The system may include lock plates that engage lock stops to prohibit rotation of the bushings in combination with the coated friction washers.

16 Claims, 7 Drawing Sheets

(56) References Cited

U.S. PATENT DOCUMENTS

2002/0133950 A1\* 9/2002 Bullard .................. B23P 19/10
                                                  29/898.07
2006/0088398 A1\* 4/2006 Lund .................... F16B 5/0225
                                                  411/155
2013/0061453 A1\* 3/2013 Rosendahl ............... E04H 5/04
                                                  29/525.11

\* cited by examiner

ANTI-ROTATION FOR ECCENTRIC BUSHINGS

FIELD OF THE DISCLOSURE

The embodiments described herein relate to a system and method of using an attachment system comprising eccentric bushings and coated friction washers, the coating on the friction washers prohibiting rotation of the bushings with respect to a fitting.

BACKGROUND

Description of the Related Art

Eccentric bushings may be used to connect bolted joints. The eccentric bushings permit the alignment of each side of the joint even when the holes through the fittings of the joint may not be perfectly aligned. However, shear loads applied to the bushings may have a tendency to rotate the bushings due to their eccentricity. In order to prohibit rotation of the bushings, the bushing may include splined teeth on the exterior of the bushing. A lock plate may be positioned around the circumference of the bushing that includes splined teeth configured to engage the teeth of the bushings. The lock plate is configured to engage a stop lock on the fitting that prohibits the rotation of the lock plate. The mating teeth between the lock plate and the bushing prohibits the rotation of the bushing.

The use of splined teeth on the components increases the manufacturing cost for the components. The splined teeth also may increase the installation time required to connect bolted joints especially if a large number of joints need to be connected. For example, an aircraft may include over forty (40) beam and frame fittings that need to be connected. For connection of a beam fitting with a frame fitting, the teeth of a bushing need to be lined up with the teeth on the lock plate. Additionally, the lock plate needs to be aligned so that a portion of the lock engages a lock stop on the fitting, which may add to the difficulty of installing the components. Other disadvantages of using an eccentric bushing and lock plate with splined teeth may exist.

SUMMARY

The present disclosure is directed to a method and system that overcomes some of the problems and disadvantages discussed above.

One embodiment is an attachment system comprising a first fitting having a first hole and a second fitting having a second hole, the second fitting positioned adjacent to the first fitting. The system comprises first and second eccentric bushings, a portion of the first eccentric bushing positioned within the first hole of the first fitting and a portion of the second eccentric bushing positioned within the second hold of the second fitting. The system comprises a first friction washer positioned between a portion of the first eccentric bushing and the first fitting, the first friction washer comprising a coating on an exterior. The system comprises a second friction washer positioned between a portion of the second eccentric bushing and the second fitting, the second friction washer comprising a coating on an exterior. The coating on the first friction washer prohibits rotation of the first eccentric bushing with respect to the first fitting and the coating on the second friction washer prohibits rotation of the second eccentric bushing with respect to the second fitting.

The second eccentric bushing may be positioned within the first eccentric bushing with the second friction washer positioned between a portion of the second eccentric bushing and a portion of the first eccentric bushing. The second friction washer may comprise a coating on an exterior, wherein the coating on the second friction washer may prohibit rotation of the second eccentric bushing with respect to the first eccentric bushing.

The coating on the first and second friction washers may be a nickel-diamond coating. The attachment system may comprise at least four attachment points between an aircraft floor and an aircraft fuselage. Each of the attachment points may comprise a first fitting having a first hole, a second fitting having a second hole, the second fitting positioned adjacent to the first fitting. Each of the attachment points may comprise first and second eccentric bushings, a portion of the first eccentric bushing positioned within the first hole of the first fitting and a portion of the second eccentric bushing positioned within the second hold of the second fitting. Each of the attachment points may comprise a first friction washer positioned between a portion of the first eccentric bushing and the first fitting, the first friction washer comprising a coating on an exterior. Each of the attachment points may comprise a second friction washer positioned between a portion of the second eccentric bushing and the second fitting, the second friction washer comprising a coating on an exterior. The coating on the first friction washer prohibits rotation of the first eccentric bushing with respect to the first fitting and the coating on the second friction washer prohibits rotation of the second eccentric bushing with respect to the second fitting.

The diamond concentration of the coating may be between about 8% and 30%. The coating on the first and second friction washers may be approximately 6 microns to 22 microns thick. The coating on the first and second friction washers may have a coefficient of friction of 0.5 or greater when lubricated. The first fitting may be a frame fitting connected to a fuselage of an aircraft and the second fitting may be a beam fitting connected to a floor of the aircraft. The system may include a spacer positioned between the first and second fittings. The system may include a first lock plate positioned around a circumference of the first friction washer and a second lock plate positioned around a circumference of the second friction washer. The system may include a first lock stop on the first fitting and a second lock stop on the second fitting, wherein the first lock plate may engage the first lock stop and the second lock plate may engage the second lock stop.

One embodiment is an attachment system comprising a first fitting have a first hole and a second fitting having a second hole, the second fitting positioned adjacent to the first fitting. The system comprises a first eccentric bushing and a second eccentric bushing. A portion of the first eccentric bushing is positioned within the first hole of the first fitting and a portion of the second eccentric bushing is positioned within the second hole of the second fitting. The first eccentric bushing comprising a coating on an exterior, wherein the coating prohibits rotation of the first bushing with respect to the first fitting. The second eccentric bushing comprising a coating on an exterior, wherein the coating prohibits rotation of the second bushing within respect to the second fitting.

The coating on the first and second eccentric bushings may be a nickel-diamond coating. The diamond concentration of the coating may be between about 8% and 30%. The coating on the first and second bushings may be approximately 6 microns to 22 microns thick. The coating on the first and second bushings may have a coefficient of friction of 0.5 or greater when lubricated. The first fitting may be a frame fitting connected to a fuselage of an aircraft and the second fitting may be a beam fitting connected to a floor of the aircraft. The system may include a spacer positioned between the first and second fittings.

One embodiment is a method comprising positioning a portion of a first eccentric bushing within a first hole of a first fitting and positioning a portion of a second eccentric bushing within a second hole of a second fitting. The method comprises positioning a first friction washer between a portion of the first eccentric bushing and the first fitting, wherein an exterior of the first friction washer comprises a nickel-diamond coating. The method comprises positioning a second friction washer between a portion of the second eccentric bushing and the second fitting, wherein an exterior of the second friction washer comprises a nickel-diamond coating.

The method may comprise rotating the first and second eccentric bushing to align an opening in the first eccentric bushing with an opening in the second eccentric bushing. The method may comprise positioning a first lock plate around a circumference of the first friction washer and engaging the first lock plate with a lock stop on the first fitting. The method may comprise positioning a second lock plate around a circumference of the second friction washer and engaging the second lock plate with a lock stop on the second fitting. The first fitting may comprise a frame fitting connected to a fuselage of an aircraft and the second fitting may comprise a beam fitting connected to a floor of the aircraft. The method may comprise positioning a spacer between the first fitting and the second fitting.

Figure 1:
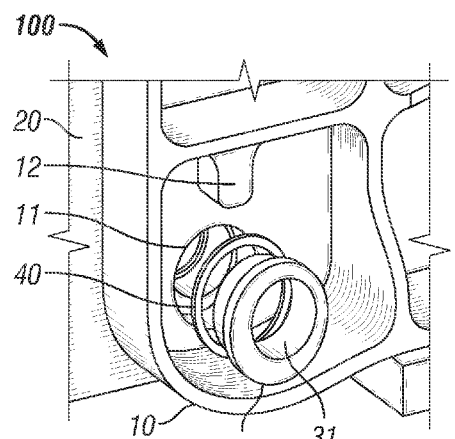
FIG. 1 shows an embodiment of an attachment system with an eccentric bushing and a coated friction washer.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

Figure 13:
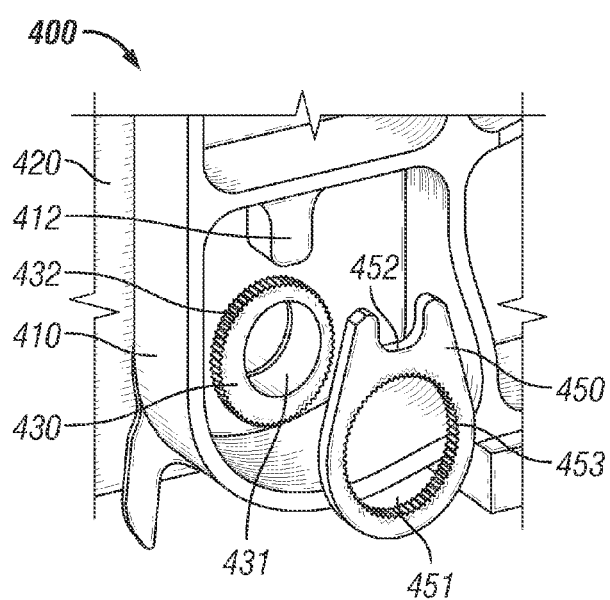
FIG. 13 shows one embodiment of a prior attachment system that utilizes teeth to prohibit rotation between the bushing and the fitting.

As discussed above, eccentric bushings may be configured with teeth to prohibit the rotation of the eccentric bushing with respect to a fitting. FIG. 13 shows a prior attachment system 400 for the connection of a first fitting 410 and a second fitting 420. Eccentric bushings 430 (only one is shown in FIG. 13) are used to align the openings in the two fittings 410 and 420 as would be appreciated by one of ordinary skill in the art having the benefit of this disclosure. A fastener (not shown) may be inserted into the opening 431 of the bushings 430 to secure the fittings 410 and 420. The perimeter of the eccentric bushings 430 includes a plurality of teeth 432 that may be used to prohibit the rotation of the bushing 430 as described herein. A lock plate 450 is positioned around the perimeter of the bushing 430. The lock plate 450 includes a central opening 451 having a plurality of teeth 453, which are configured to engage the teeth 432 along the perimeter of the bushing 430. The lock plate 450 includes a notch 452 that is configured to engage a lock stop 412 of the fitting 410. The lock stop 412 prohibits the rotation of the lock plate 450 when the notch is engaged with the lock stop 412. The teeth 453 of the lock plate 450 then prohibit the rotation of the bushing 430 when engaged with the teeth 432 of the bushing 430.

The installation of the bushing 430 and lock plate 450 require the alignment of the teeth, which can be time consuming. Further, the notch 452 of the lock plate 450 has to be aligned with the lock stop 412 of the fitting 410, which may also increase the time required to install the attachment system 400 especially if there are a large number of fittings 410 and 420 that need to be connected together. In an aircraft, there may be 40 or more connections required to connect the floor beams to the fuselage frame. The intricate teeth on the components also increase the cost of the individual parts for the attachment system 400. It would be beneficial to provide an attachment system that can be installed in less time, with less difficulty, and/or use less expensive parts.

Figure 8:
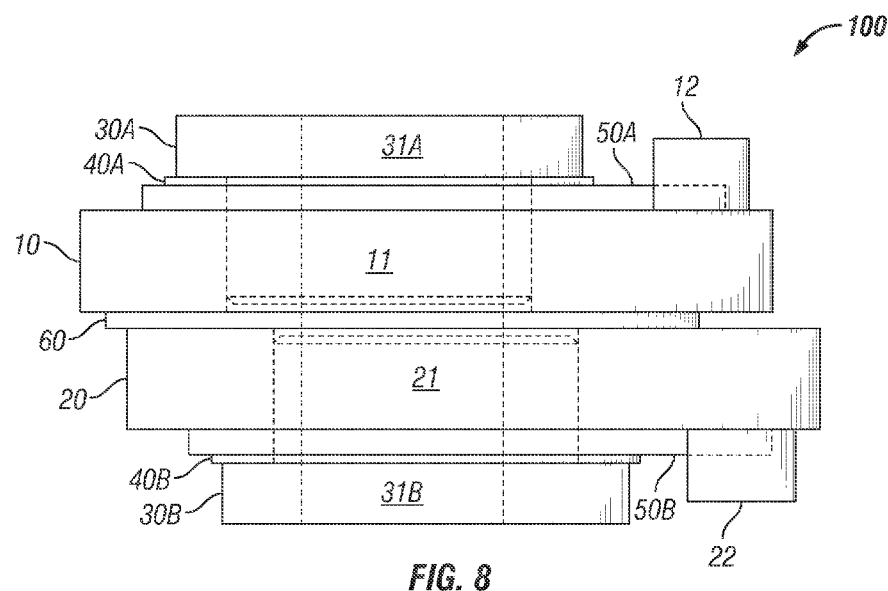
FIG. 8 is a schematic cross-section view of one embodiment of an attachment system.

FIG. 1 shows one embodiment of an attachment system 100 that includes a first fitting 10 and a second fitting 20 each that include an opening 11 and 21 (shown in FIG. 8). An eccentric bushing 30 having an opening 31 may be inserted into the opening 11 in the first fitting 10. Although not shown in FIG. 1, a second eccentric bushing 30 may be inserted into the opening 21 of the second fitting as would be appreciated by one of ordinary skill in the art having the benefit of this disclosure. A coated friction washer 40 is positioned between at least a portion of the eccentric bushing 30 and the first fitting 10. The coated friction washer 40 is coated with a coating that prohibits the rotation of the bushing 30 with respect to the fitting 10. As used herein, "prohibits" means significantly or substantially inhibiting the rotation and/or movement of, including, but not limited to, completely preventing rotation and/or movement. A coated friction washer 40 may also be positioned between a second bushing 30 and the second fitting 20 to prohibit the rotation of the second bushing 30 with respect to the second fitting 20. The first fitting 10 may be a frame fitting connected to the fuselage of an aircraft and the second fitting 20 may be a beam fitting connected to a floor of the aircraft. The attachment system 100 may be used to connect the floor beam to frame fittings of an aircraft. The components such as the bushing 30 does not include teeth and thus, may be installed more quickly and/or may be produced at a lower cost than the components of attachment systems that utilize teeth to prohibit rotation.

The coating on the friction washer 40 is used to provide a high friction interface between the fittings 10 and 20 and the eccentric bushing 30. The coating on the friction washer 40 may be a nickel-diamond coating that prohibits the rotation of the bushing 30. The nickel-diamond coating may have a diamond concentration of between approximately 8-30%. The coating on the friction washer 40 may have a thickness of between approximately 6 microns and 22 microns. The coating may be EKAGRIP commercially offered by 3M of St. Paul, Minn. The coating on the friction washer 40 may ensure that the friction washer 40 has a coefficient of friction of 0.5 or greater even when lubricant, such as an oil film, is present on the surface of the friction washer 40.

Figure 2:
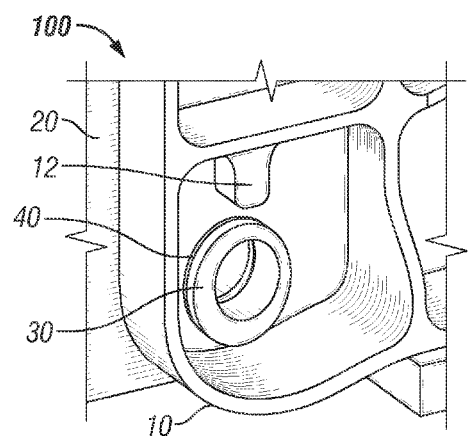
FIG. 2 shows the embodiment of FIG. 1 with a portion of the eccentric bushing positioned within a fitting.
Figure 3:
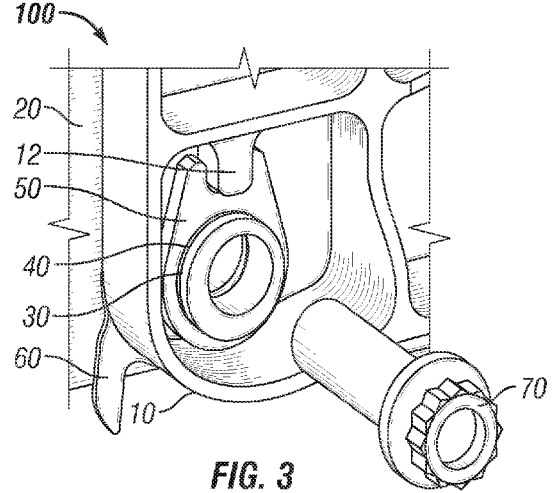
FIG. 3 shows the embodiment of FIG. 1 with a portion of the eccentric bushing positioned within a fitting and a fastener positioned adjacent the eccentric bushing.

FIG. 2 shows a portion of the bushing 30 positioned within the opening 11 of the fitting 10 with the coated friction washer 40 positioned between at least a portion of the bushing 30 and the fitting 10. A lock plate 50 is positioned around the perimeter of the friction washer 30. The lock plate 50 is configured to engage a lock stop 12 of the fitting 10. FIG. 3 shows a fastener 70 that may be used to fasten the first fitting 10 and the second fitting 20 together through the openings 31 in the two eccentric bushings 30. FIG. 3 also shows that a spacer 60 may be positioned between the first and second fittings 10 and 20.

Figure 4:
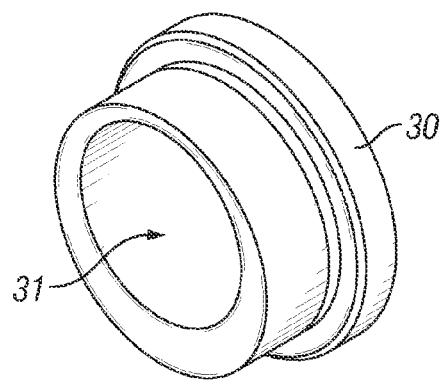
FIG. 4 is an embodiment of an eccentric bushing.
Figure 5:
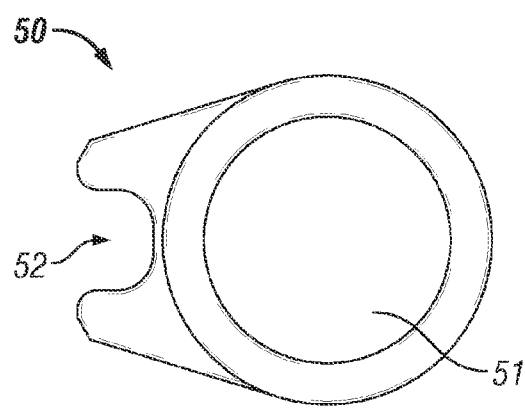
FIG. 5 is an embodiment of a lock plate.
Figure 6:
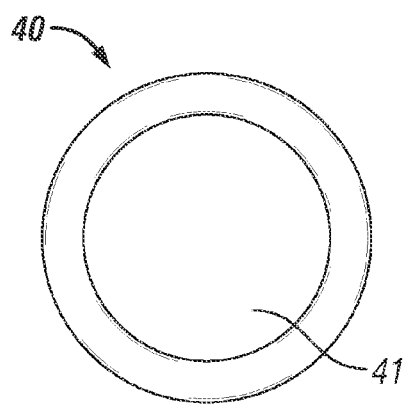
FIG. 6 is an embodiment of a coated friction washer.

FIG. 4 shows one embodiment of an eccentric bushing 30 with an opening 31. The use of eccentric bushings 30 permits the alignment of two holes by the rotation of the two eccentric bushings 30 as described herein in regards to FIGS. 7A-7C. FIG. 5 shows one embodiment of a lock plate 50 having a central opening 51 and a notch 52 configured to engage a lock stop 12 or 22 (shown in FIG. 8) on a fitting 10 or 20 (shown in FIG. 8). The lock stop 12 or 22 may be integral to the fitting 10 or 20 or may be a separate member connected to the fitting 10 or 20 as would be appreciated by one of ordinary skill in the art having the benefit of this disclosure. FIG. 6 shows an embodiment of a coated friction washer 40 having an opening 41.

Figure 11:
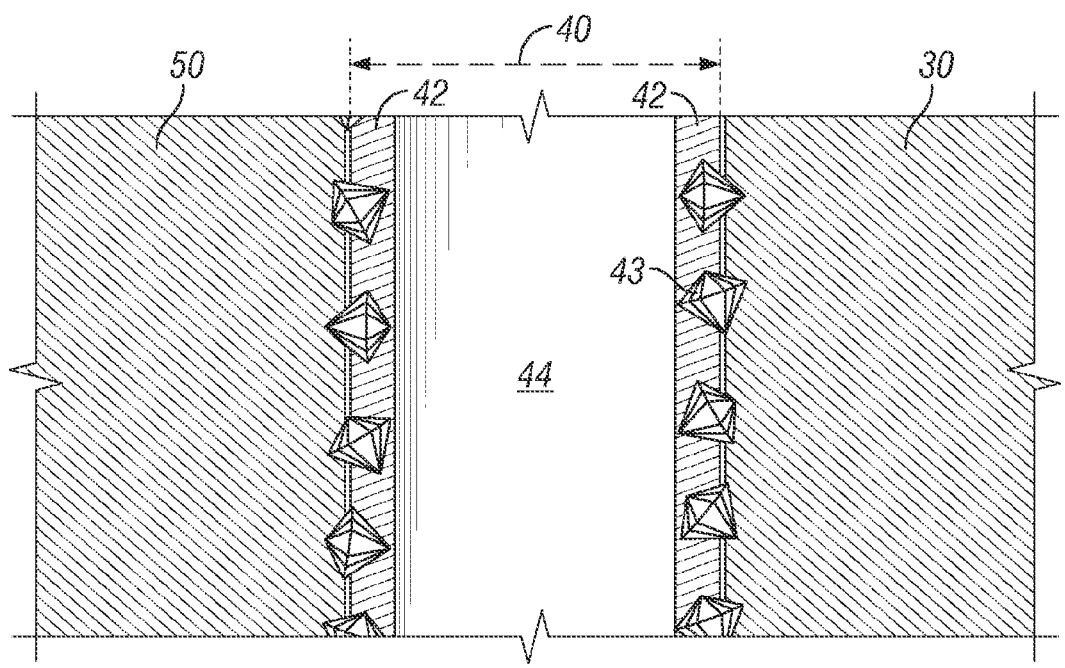
FIG. 11 is a schematic cross-section view of one embodiment of an attachment system showing a coated friction washer positioned between a lock plate and a portion of an eccentric bushing.

FIG. 11 shows a schematic of a friction washer 40 positioned between a lock plate 50 and an eccentric bushing 30. The friction washer 40 includes a core 44 that is covered with a coating 42 that provides a high coefficient of friction between the friction washer 40 and the adjacent components, which in FIG. 11 may be a lock plate 50 and an eccentric bushing 30. The coating 42 may be a nickel-diamond coating, which includes diamonds 43 within the coating 42 as shown in FIG. 11. The diamonds 43 provide friction to prohibit the rotation of the friction washer 40 and adjoining components, such as an eccentric bushing 30 and a lock plate 50, even if covered in a layer of grease or oil. Friction washer 40 is shown in FIG. 11 as including a nickel-diamond coating 42 for illustrative purposes only. Various coatings 42 may be used to provide an interface between the components that prohibits rotation and/more movement between the components as would be appreciated by one of ordinary skill in the art having the benefit of this disclosure. Additionally, the coating 42 could be applied to the other components in addition or instead of the friction washer 40 as would be appreciated by one of ordinary skill in the art and as disclosed herein.

Figure 7A:
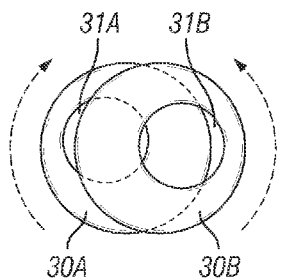
FIGS. 7A-7C show the rotation of two eccentric bushings to align holes within the bushing.
Figure 7B:
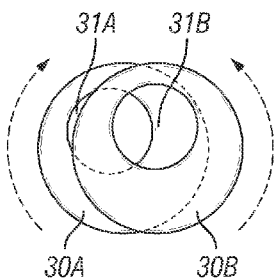
Figure 7C:
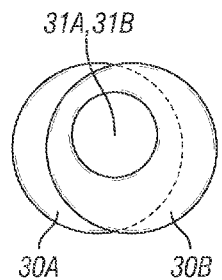

FIGS. 7A-7C show the rotation of two eccentric bushings to align holes 31 within the bushings 30. FIG. 7A shows a first eccentric bushing 30A having an opening 31A and a second eccentric bushing 30B having an opening 31B. The bushings 30A and 30B may be rotated as indicated by the arrows. FIG. 7B shows the bushings 30A and 30B rotated with respect to FIG. 7A, but the openings 31A and 31B are not yet aligned. FIG. 7C shows bushings 30A and 30B that have been rotated until the openings 31A and 31B are aligned. The use of eccentric bushings 30 permit the alignment of openings so fasteners may be inserted and connect fittings that may have openings slightly out of alignment due to acceptable tolerances.

FIG. 8 shows a schematic cross-section of an attachment system 100 that includes a first fitting 10 and a second fitting 20 each that include an opening 11 and 21. A first eccentric bushing 30A has been inserted into the opening 11 of the first fitting 10 and a second eccentric bushing 30B has been inserted into the opening 21 of the second fitting 20. The system 100 may include a spacer 60 positioned between the first and second fittings 10 and 20. As discussed herein, one or both of the eccentric bushings 30A and 30B may be rotated until openings 31A and 31B of the eccentric bushings 30A and 30B are aligned. A first coated friction washer 40A may be positioned between a portion, such as the head, of the first eccentric bushing 30A and the a first lock plate 50A and a second coated friction washer 40B may be positioned between a portion, such as the head, of the second eccentric bushing 30B and a second lock plate 50B.

The first lock plate 50A may engage a lock stop 12 on the first fitting 10 that prohibits the rotation of the first lock plate 50A. Likewise, the second lock plate 50B may engage a lock stop 22 on the second fitting 20 that prohibits the rotation of the second lock plate 50B. The coating on the friction washers 40A and 40B and engagement of the first and second lock plates 50A and 50B may prohibit the rotation of the eccentric bushings 30A and 30B with respect to the fittings 10 and 20. As discussed herein, the coating may be nickel-diamond which will provide a sufficient coefficient of friction on the interfaces of the friction washers 40A and 40B even in the presence of a lubricant. As discussed herein, the bushings 30A and 30B are eccentric may be used to align holes in two fittings. For example, the attachment system 100 may be used to attach a floor to a fuselage of an aircraft. One or more corners of attachment points between the floor and the fuselage may be aligned and not require the use of eccentric bushings 30. As the floor is attached to the fuselage at attachment points moving away from the aligned fittings the eccentric bushings 30 may need to be used to align the fitting holes.

Figure 9:
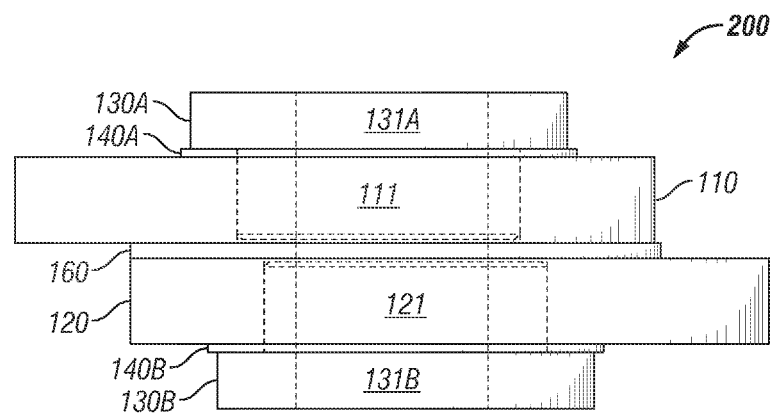
FIG. 9 is a schematic cross-section view of one embodiment of an attachment system.

FIG. 9 shows a schematic cross-section of an attachment system 200 that includes a first fitting 110 and a second fitting 120 each that include an opening 111 and 121. A first eccentric bushing 130A has been inserted into the opening 111 of the first fitting 110 and a second eccentric bushing 130B has been inserted into the opening 121 of the second fitting 120. The system 200 may include a spacer 160 positioned between the first and second fittings 110 and 120. As discussed herein, one or both of the eccentric bushings 130A and 130B may be rotated until openings 131A and 131B of the eccentric bushings 130A and 130B are aligned. A first coated friction washer 140A may be positioned between a portion, such as the head, of the first eccentric bushing 130A and the first fitting 110 and a second coated friction washer 140B may be positioned between a portion, such as the head, of the second eccentric bushing 130B and the second fitting 120. The coating on the friction washers 140A and 140B may prohibit the rotation of the eccentric bushings 130A and 130B with respect to the fittings 110 and 120. As discussed herein, the coating may be nickel-diamond which will provide a sufficient coefficient of friction on the interfaces of the friction washers 140A and 140B even in the presence of a lubricant. As discussed herein, the bushings 130A and 130B are eccentric may be used to align holes in two fittings. For example, the attachment system 200 may be used to attach a floor to a fuselage of an aircraft. One or more corners of attachment points between the floor and the fuselage may be aligned and not require the use of eccentric bushings 130. As the floor is attached to the fuselage at attachment points moving away from the aligned fittings the eccentric bushings 130 may need to be used to align the fitting holes.

Figure 10:
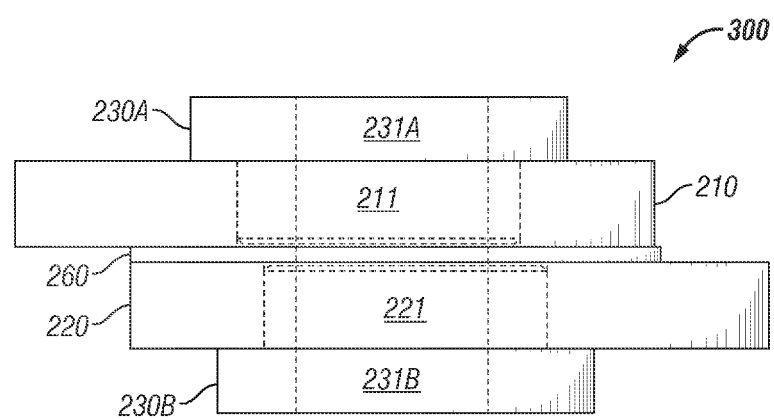
FIG. 10 is a schematic cross-section view of one embodiment of an attachment system.

FIG. 10 shows a schematic cross-section of an attachment system 300 that includes a first fitting 210 and a second fitting 220 each that include an opening 211 and 221. A first eccentric bushing 230A has been inserted into the opening 211 of the first fitting 210 and a second eccentric bushing 230B has been inserted into the opening 221 of the second fitting 220. The system 300 may include a spacer 260 positioned between the first and second fittings 210 and 220. As discussed herein, one or both of the eccentric bushings 230A and 230B may be rotated until openings 231A and 231B of the eccentric bushings 230A and 230B are aligned. Each of the eccentric bushings 230A and 230B may include a coating on its exterior interfacing surfaces, thrust or radial, that prohibits the rotation of the bushings 230A and 230B respect to the fittings 210 and 220. As discussed herein, the coating may be nickel-diamond which will provide a sufficient coefficient of friction on the interfaces of the bushings 230A and 230B even in the presence of a lubricant. As discussed herein, the bushings 230A and 230B are eccentric may be used to align holes in two fittings. For example, the attachment system 300 may be used to attach a floor to a fuselage of an aircraft. One or more corners of attachment points between the floor and the fuselage may be aligned and not require the use of eccentric bushings 230. As the floor is attached to the fuselage at attachment points moving away from the aligned fittings the eccentric bushings 230 may need to be used to align the fitting holes.

Figure 12:
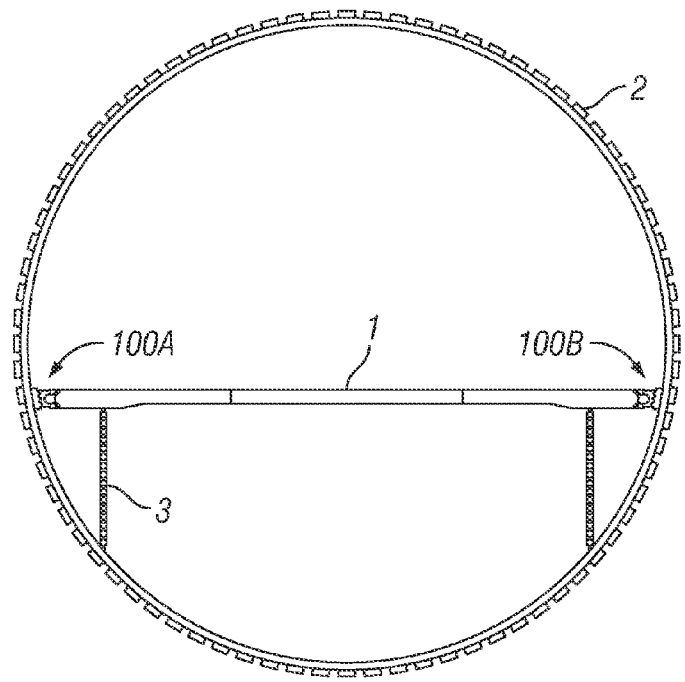
FIG. 12 shows a schematic of one embodiment of an attachment system connecting the floor of an aircraft to the fuselage of the aircraft at multiple attachment points.

FIG. 12 shows a schematic of an attachment system 100 connecting the floor 1 of an aircraft to the fuselage 2 of the aircraft. Stanchions 3 may provide additional connection points between the floor 1 and the fuselage 2. The schematic of FIG. 12 shows an attachment system 100A connecting the floor 1 to the fuselage 2 at a left front corner of the floor 1 and attachment system 100B connecting the floor 1 to the fuselage 2 at a right front corner of the floor 1. A plurality of attachment systems may connect the floor 1 to the fuselage 2 along the length of the floor 1 between the front and rear corners of the floor 1 as would be appreciated by one of ordinary skill in the art having the benefit of this disclosure. Various embodiments of attachment systems disclosed herein may be used to connect the floor 1 to the fuselage 2. The combination of eccentric bushings and friction washers may not be necessary at each attachment point along the length of the floor. For example, the fitting holes of the floor and fuselage may be aligned at the midpoint of the floor not requiring the eccentric bushings to be rotated for alignment of the holes. As the attachment points are connected moving away from the initial midpoint connections the eccentric bushings in combination with the friction washers disclosed herein may be used to align the fitting holes between the floor and the fuselage. The initial attachment points between the floor and the fuselage, whether at the midpoint, corner, or other locations, may be aligned and not require the use of eccentric bushings and non-eccentric bushings may be used, or if eccentric bushings are used in the connection assembly, the eccentric bushings may not need to be rotated to align the fastener openings. As the attachment points between the floor and the fuselage are connected moving away from the initial attachment points, the fastener openings may move out of alignment necessitating the use of eccentric bushings that may be rotated to align the openings as discussed herein. The non-eccentric bushings and/or eccentric bushings may be coated with nickel-diamond to prohibit rotation and/or nickel-diamond coated washers may be used to prohibit rotation of the eccentric bushings.

FIG. 12 shows the use of the attachment systems disclosed herein to attach a floor to a fuselage for illustrative purposes only. For example, the disclosed attachment systems may be used to secure various assemblies and not just the floor to a fuselage as would be appreciated by one of ordinary skill in the art having the benefit of this disclosure. The eccentric bushings and coated friction washers permit the alignment of holes between various fittings while ensuring a tight connection. Attachment systems utilizing eccentric bushings and coated friction washers may reduce or eliminate the need to drill match holes in components during the assembly process, which may reduce the time and cost during assembly.

Figure 14:
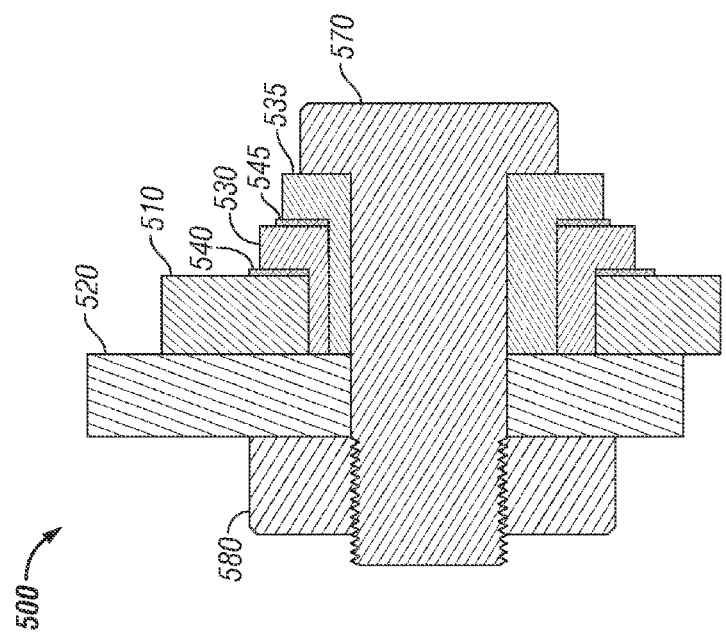
FIG. 14 shows a schematic cross-section view of one embodiment of an attachment system showing a coated friction washer positioned between an eccentric bushing and a fitting and a second coated friction washer positioned between two eccentric bushings.

FIG. 14 shows a schematic cross-section of an attachment system 500 that includes a first fitting 510 and a second fitting 520. FIG. 14 shows the first fitting 510 being adjacent to the second fitting 520 for illustrative purposes only as the two fittings 510 and 520 could be separate by one or more elements as would be appreciated by one of ordinary skill in the art. For example, a lug having a fastener opening could be positioned between the first and second fittings 510 and 520. A first eccentric bushing 530 has been inserted into the opening of the first fitting 510 with a first coated friction washer 540 positioned between the first eccentric bushing 530 and the first fitting 510. The coated friction washer 540 prohibits the rotation of the first eccentric bushing 530 with respect to the first fitting 510 as discussed herein. In lieu of coated washers the bushings 510 and 520 may include a friction coating on their exterior interfacing surfaces, thrust or radial, to prohibit rotation.

The attachment system 500 includes a second eccentric bushing 535 positioned within the first eccentric bushing 530. A second coated friction washer 545 is positioned between the first eccentric bushing 530 and the second eccentric bushing 535. The coated friction washer 545 prohibits the rotation of the second eccentric bushing 535 with respect to the first eccentric bushing 530. As discussed herein, the eccentric bushings 530 and 535 may be rotated to align openings to permit the insertion of a fastener 570 through the bushing 530 and 535, first fitting 510, and second fitting 520 with a nut 580 threaded onto the fastener 570 to secure the system 500 together.

Figure 15:
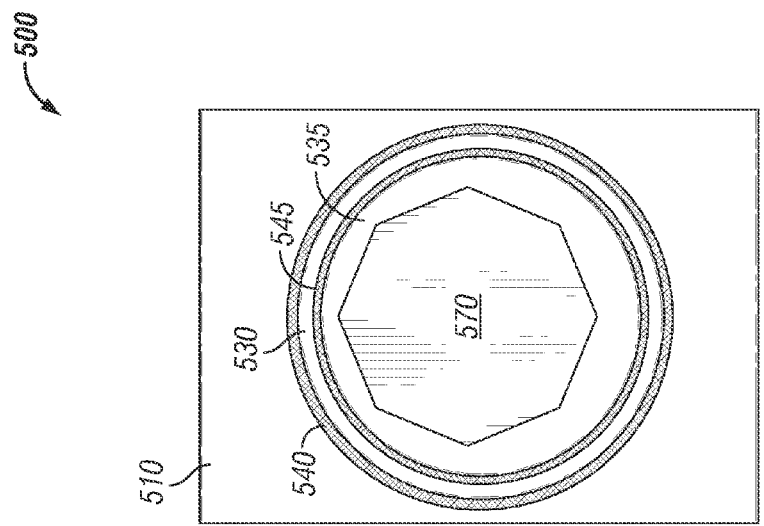
FIG. 15 shows a schematic front view of the attachment system of claim 14.

FIG. 15 shows a front view of the attachment system 500 with a first coated friction washer 540 positioned between a first fitting 510 and a first eccentric bushing 530. A second coated friction washer 545 is positioned between the first eccentric bushing 530 and a second eccentric bushing 535 positioned within the first eccentric bushing 530. The use of two eccentric bushing 530 and 535, one positioned within the other, may be beneficial to secure an assembly when there is limited space on one side of the assembly as would be appreciated by one of ordinary skill in the art having the benefit of this disclosure.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof

What is claimed is:

1. An attachment system comprising:
a first fitting having a first hole extending from a first side to a second side of the first fitting and a first surface on the first side of the first fitting;
a second fitting having a second hole, the second fitting positioned adjacent to the first fitting;
a first eccentric bushing having a first portion and a second portion, the first portion of the first eccentric bushing positioned within the first hole of the first fitting and the second portion positioned outside of the first fitting, the second portion having a second surface surrounding the first portion of the first eccentric bushing;
a first friction washer positioned between the second surface on the second portion of the first eccentric bushing and the first surface on the first fitting, the first friction washer comprising a coating on an exterior;
a second eccentric bushing, at least a portion of the second eccentric bushing positioned within the first eccentric bushing; and
a second friction washer positioned between the second eccentric bushing and the first eccentric bushing, the second friction washer comprising a coating on an exterior;
wherein the coating on the first friction washer prohibits rotation of the first eccentric bushing with respect to the first fitting and the coating on the second friction washer prohibits rotation of the second eccentric bushing with respect to the first eccentric bushing.

2. The system of claim 1, wherein the coating on the first and second friction washers comprises a nickel-diamond coating.

3. The system of claim 2, wherein the attachment system further comprises at least four attachment points between an aircraft floor and an aircraft fuselage, wherein each attachment point comprises each of the first fitting, the second fitting, the first eccentric bushing, the second eccentric bushing, the first friction washer, and the second friction washer.

4. The system of claim 3, wherein the at least four attachment points are located at corners of the aircraft floor.

5. The system of claim 2, wherein the diamond concentration on the first and second friction washers is between 830%.

6. The system claim 2, wherein the coatings of the first and second friction washers has a thickness between 6 microns and 22 microns.

7. The system of claim 2, wherein the coatings have a coefficient of friction of 0.5 or greater when lubricated.

8. The system of claim 2, wherein the first fitting comprises a frame fitting connected to a fuselage of an aircraft and wherein the second fitting comprises a beam fitting connected to a floor of the aircraft.

9. The system of claim 8, further comprising a spacer positioned between the first fitting and the second fitting.

10. The system of claim 9, further comprising:
a first lock plate positioned around a circumference of the first friction washer; and
a first lock stop on the first fitting, wherein the first lock plate engages the first lock stop.

11. The system of claim 1, further comprising a fastener, wherein the fastener extends through the first fitting, the second fitting, the first eccentric bushing, and the first friction washer.

12. A method of attaching a first fitting and a second fitting, the method comprising:
positioning a first portion of a first eccentric bushing within a first hole of a first fitting, a second portion of the first eccentric bushing positioned outside of the first fitting, the first hole extending from a first side to a second side of the first fitting, the second portion having a second surface surrounding the first portion of the first eccentric bushing, the first fitting being positioned adjacent to a second fitting having a second hole;
positioning a first friction washer between the second surface on the second portion of the first eccentric bushing and a first surface on the first side of the first fitting, wherein an exterior of the first friction washer comprises a coating that prohibits rotation of the first eccentric bushing with respect to the first fitting;
positioning at least a portion of a second eccentric bushing within the first eccentric bushing; and
positioning a second friction washer between the second eccentric bushing and the first eccentric bushing, the second friction washer comprising a coating on an exterior that prohibits rotation of the second eccentric bushing with respect to the first eccentric bushing.

13. The method of claim 12, further comprising:
positioning a first lock plate around a circumference of the first friction washer; and
engaging the first lock plate with a lock stop on the first fitting.

14. The method of claim 12, wherein the first fitting comprises a frame fitting connected to a fuselage of an aircraft and wherein the second fitting comprises a beam fitting connected to a floor of the aircraft.

15. The method of claim 14, further comprising positioning a spacer between the first fitting and the second fitting.

16. The method of claim 12, wherein the coating on the first and second friction washers comprises a nickel-diamond coating.

* * * * *